(12) United States Patent
Kasuya et al.

(10) Patent No.: US 11,352,924 B2
(45) Date of Patent: Jun. 7, 2022

(54) EXHAUST GAS PURIFICATION CATALYST DEVICE

(71) Applicant: CATALER CORPORATION, Kakegawa (JP)

(72) Inventors: Chihiro Kasuya, Kakegawa (JP); Yuji Yabuzaki, Kakegawa (JP); Masaaki Kawai, Kakegawa (JP); Mitsuyoshi Okada, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/251,942

(22) PCT Filed: Jun. 26, 2019

(86) PCT No.: PCT/JP2019/025461
§ 371 (c)(1),
(2) Date: Dec. 14, 2020

(87) PCT Pub. No.: WO2020/008981
PCT Pub. Date: Jan. 9, 2020

(65) Prior Publication Data
US 2021/0310391 A1 Oct. 7, 2021

(30) Foreign Application Priority Data
Jul. 5, 2018 (JP) .............................. JP2018-128204

(51) Int. Cl.
*B01J 23/42* (2006.01)
*B01J 23/44* (2006.01)
(Continued)

(52) U.S. Cl.
CPC .............. *F01N 3/101* (2013.01); *B01J 23/42* (2013.01); *B01J 23/44* (2013.01); *B01J 23/464* (2013.01);
(Continued)

(58) Field of Classification Search
CPC .............. B01D 53/9445; B01D 53/945; B01D 2255/102; B01D 2255/903;
(Continued)

(56) References Cited

U.S. PATENT DOCUMENTS 4,071,600 A * 1/1978 Schlatter .............. B01D 53/945
423/213.7
11,117,098 B2 * 9/2021 Li ........................ B01D 53/945
(Continued)

FOREIGN PATENT DOCUMENTS

JP 2006-205134 A 8/2006
JP 2009-226249 A 10/2009
(Continued)

OTHER PUBLICATIONS

Aug. 20, 2019 Search Report issued in International Patent Application No. PCT/JP2019/025461.
(Continued)

*Primary Examiner* — Timothy C Vanoy
(74) *Attorney, Agent, or Firm* — Oliff PLC

(57) ABSTRACT

An exhaust gas purification catalyst device has catalyst coating layers, which extend from the upstream side to the downstream side of the exhaust gas flow. The catalyst coating layers each have at least three zones present in order from the upstream side to the downstream side of the exhaust gas flow, and each of these at least three zones is an oxidation catalyst zone or a reduction catalyst zone. In the uppermost layer of an oxidation catalyst zone, the total number of atoms of platinum and palladium is greater than the number of atoms of rhodium; in the upper most layer of a reduction catalyst zone, the number of atoms of rhodium is greater than the total number of atoms of platinum and
(Continued)

palladium. The oxidation catalyst zones and the reduction catalyst zones alternate at least twice in the exhaust gas flow direction.

20 Claims, 7 Drawing Sheets

(51) Int. Cl.
    *B01J 23/46*     (2006.01)
    *F01N 3/10*     (2006.01)
    *F01N 3/28*     (2006.01)

(52) U.S. Cl.
    CPC ........ *F01N 3/28* (2013.01); *F01N 2510/0684* (2013.01)

(58) Field of Classification Search
    CPC .... B01D 2255/9035; B01D 2255/9037; B01D 2258/012; B01J 23/40; B01J 2523/82; F01N 3/101
    See application file for complete search history.

(56) References Cited

U.S. PATENT DOCUMENTS

| | | | |
|---|---|---|---|
| 2009/0124494 | A1 | 5/2009 | Suzuki et al. |
| 2017/0197179 | A1* | 7/2017 | Yoshikawa .......... B01J 37/0244 |
| 2019/0308173 | A1* | 10/2019 | Markatou ................ F01N 3/18 |
| 2020/0078769 | A1* | 3/2020 | Andersen ............... B01J 23/464 |

FOREIGN PATENT DOCUMENTS

| | | |
|---|---|---|
| JP | 2010-179204 A | 8/2010 |
| JP | 2015-085241 A | 5/2015 |
| JP | 2017-200677 A | 11/2017 |

OTHER PUBLICATIONS

Aug. 20, 2019 Written Opinion issued in International Patent Application No. PCT/JP2019/025461.
Mar. 1, 2022 Extended European Search Report issued in European Patent Application No. 19831111.0.

\* cited by examiner

FIG. 1
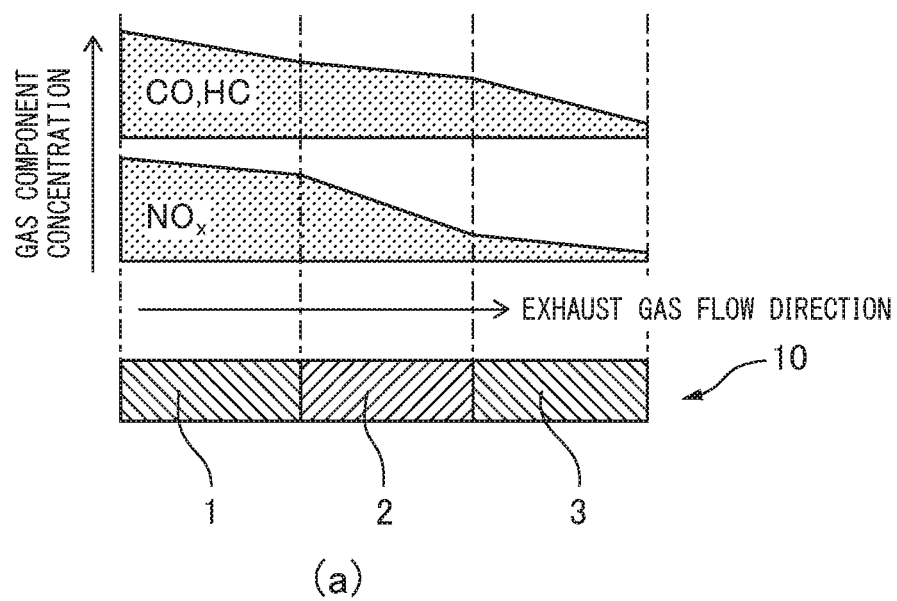
(a)
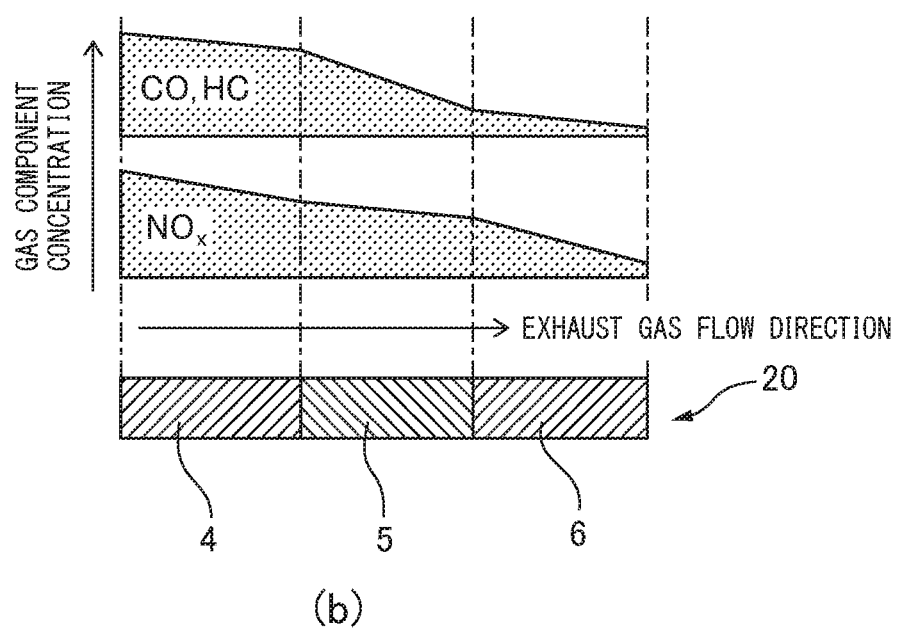
(b)

FIG. 2
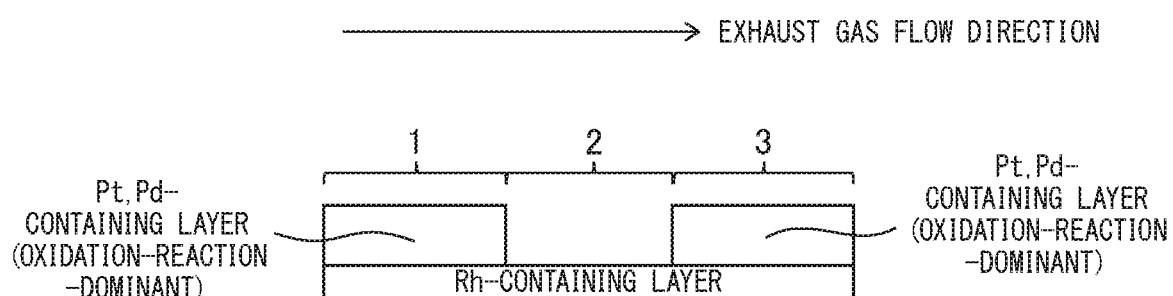
(a)
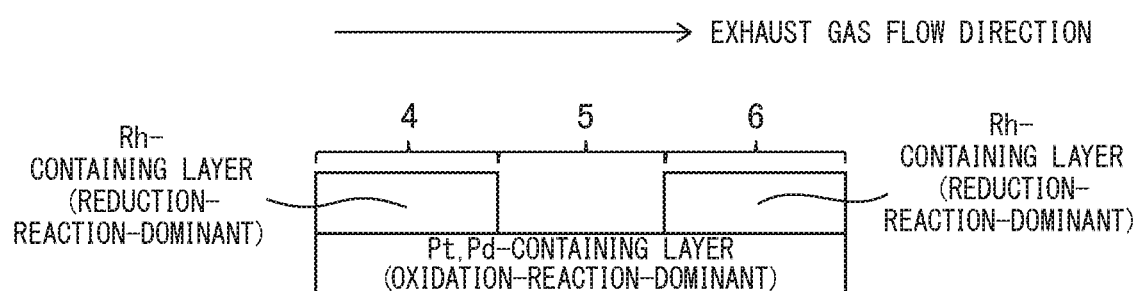
(b)

EXHAUST GAS PURIFICATION CATALYST DEVICE

FIELD

The present invention relates to an exhaust gas purification catalyst device.

BACKGROUND

The exhaust gases from internal combustion engines, such as automobile engines, contain nitrogen oxides ($NO_x$), carbon monoxide (CO), and hydrocarbons (HC). Thus, these exhaust gases are released into the atmosphere after being purified by an exhaust gas purification catalyst which oxidizes CO and HC and reduces $NO_x$.

As a typical exhaust gas purification catalyst, three-way catalysts in which precious metals such as platinum (Pt), palladium (Pd), and rhodium (Rh) are supported on a porous metal oxide carrier are known. Among these precious metals, Pt and Pd are considered to function as oxidation catalysts and contribute to the oxidation purification of CO and HC, and Rh is considered to function as a reduction catalyst and contribute to the reduction and purification of $NO_x$.

In such an exhaust gas purification catalyst, a technology for improving catalyst performance in which a catalyst coating layer has a two-layer structure including a lower layer containing Pd and an upper layer containing Rh has been proposed (Patent Literature 1). A technology in which a lower layer containing Pd is formed over the entire length of an exhaust gas purification catalyst device and an upper layer containing Rh is formed only on the upstream side of the exhaust gas flow has been proposed (Patent Literature 2).

Conventionally, the catalyst coating layer in exhaust gas purification catalyst devices as described above has been formed on a substrate which does not itself have an exhaust gas purification ability, for example, a honeycomb substrate made of cordierite. However, in recent years, exhaust gas purification catalysts in which a precious metal is supported on a substrate composed of inorganic oxide particles has been proposed (Patent Literature 3).

CITATION LIST

Patent Literature

[PTL 1] Japanese Unexamined Patent Publication (Kokai) No. 7-6017
[PTL 2] Japanese Unexamined Patent Publication (Kokai) No. 9-85091
[PTL 3] Japanese Unexamined Patent Publication (Kokai) No. 2015-85241

SUMMARY

Technical Problem

The object of the preset invention is to provide an exhaust gas purification device which has an excellent balance between oxidation purification of CO and HC and reduction purification of $NO_x$ in exhaust gas, and has high purification efficiency for all of CO, HC, and $NO_x$.

Solution to Problem

The present invention is as described below.

<<Aspect 1>>

An exhaust gas purification catalyst device having a catalyst coating layer which extends from an upstream side to a downstream side of an exhaust gas flow, wherein the catalyst coating layer has three or more zones present in order facing from the upstream side to the downstream side of the exhaust gas flow, each of the three or more zones is an oxidation catalyst zone or a reduction catalyst zone, in an uppermost layer of the oxidation catalyst zone, a total number of atoms of platinum (Pt) and palladium (Pd) is greater than a number of atoms of rhodium (Rh), in an uppermost layer of the reduction catalyst zone, a number of atoms of rhodium (Rh) is greater than a total number of atoms of platinum (Pt) and palladium (Pd), and the oxidation catalyst zone and the reduction catalyst zone alternate at least twice in the exhaust gas flow direction.

<<Aspect 2>>

The exhaust gas purification catalyst device according to Aspect 1, wherein the reduction catalyst zone is composed of a catalyst coating layer containing a precious metal, which is Rh, and the oxidation catalyst zone is composed of a catalyst coating layer having a two-layer structure including a lower layer containing a precious meal, which is Rh, and an upper layer, on the lower layer, containing a precious metal selected from Pt and Pd.

<<Aspect 3>>

The exhaust gas purification catalyst device according to Aspect 1, wherein the oxidation catalyst zone is composed of a catalyst coating layer containing a precious metal selected from Pt and Pd, and the reduction catalyst zone is composed of a catalyst coating layer having a two-layer structure including a lower layer containing a precious metal selected from Pt and Pd and an upper layer, on the lower layer, containing a precious metal, which is Rh.

<<Aspect 4>>

The exhaust gas purification catalyst device according to any one of Aspects 1 to 3, wherein among the three or more zones, a total of the length of the oxidation catalyst zone is 15% to 85% of the total length of the catalyst coating layer.

<<Aspect 5>>

The exhaust gas purification catalyst device according to any one of Aspects 1 to 4, wherein among the three or more zones, a total of the length of the reduction catalyst zone is 15% to 85% of the total length of the catalyst coating layer.

<<Aspect 6>>

The exhaust gas purification catalyst device according to any one of Aspects 1 to 5, wherein a number of alternations of the oxidation catalyst zone and the reduction catalyst zone in an exhaust gas flow direction is two or three.

<<Aspect 7>>

The exhaust gas purification catalyst device according to any one of Aspects 1 to 6, wherein the catalyst coating layer is present on a substrate.

<<Aspect 8>>

The exhaust gas purification catalyst device according to Aspect 7, wherein the catalyst coating layer is divided and present on two substrates arranged in series in the exhaust gas flow direction, and the exhaust gas purification catalyst device is a combination of a pre-stage catalyst and a post-stage catalyst.

<<Aspect 9>>

The exhaust gas purification catalyst device according to Aspect 8, wherein the post-stage catalyst is an underfloor catalyst.

<<Aspect 10>>

The exhaust gas purification catalyst device according to Aspect 7, wherein the catalyst coating layer is present on one substrate.

<<Aspect 11>>

The exhaust gas purification catalyst device according to any one of Aspects 1 to 6, wherein at least a part of the catalyst coating layer constitutes a part of a substrate.

Advantageous Effects of Invention

The exhaust gas purification catalyst device of the present invention has an excellent balance between oxidation purification of CO and HC and reduction purification of $NO_x$ in exhaust gas, and has high purification efficiency for all of CO, HC and $NO_x$ in exhaust gas.

BRIEF DESCRIPTION OF DRAWINGS

FIG. 1 is a conceptual view explaining the mode of operation of the exhaust gas purification catalyst device of the present invention. FIG. 1(a) relates to an exhaust gas purification catalyst device having three zones including, in order, an oxidation catalyst zone, a reduction catalyst zone, and an oxidation catalyst zone, and FIG. 1(b) relates to an exhaust gas purification catalyst device having three zones including, in order, a reduction catalyst zone, an oxidation catalyst zone, and a reduction catalyst zone.

FIG. 2 is a schematic cross-sectional view showing an example of the layer structure of a catalyst coating layer in the exhaust gas purification catalyst device of the present invention. FIG. 2(a) shows a catalyst coating layer according to a first aspect, wherein a reduction catalyst zone is composed of a catalyst coating layer containing Rh, and an oxidation catalyst zone is composed of a catalyst coating layer having a two-layer structure including a lower layer containing Rh and an upper layer containing Pt and/or Pd, and FIG. 2(b) shows a catalyst coating layer according to a second aspect, wherein an oxidation catalyst zone is composed of a catalyst coating layer containing Pt and/or Pd, and an oxidation catalyst zone composed of a catalyst coating layer having a two-layer structure including a lower layer containing Pt and/or Pd and an upper layer containing Rh.

DESCRIPTION OF EMBODIMENTS

<<Exhaust Gas Purification Catalyst Device>>

Figure 3:
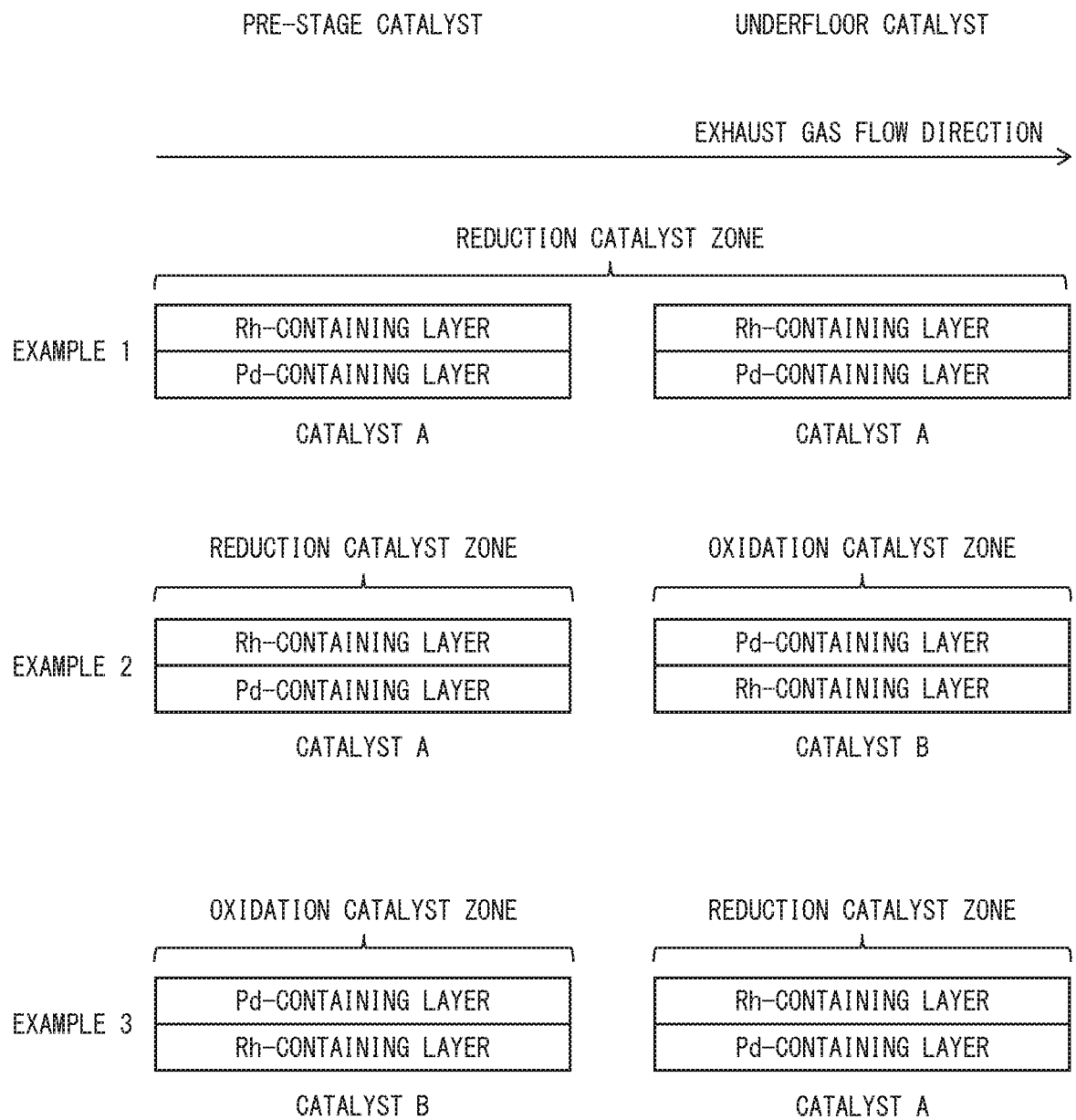
FIG. 3 is a schematic cross-sectional view showing the structures of the catalyst coating layers of the exhaust gas purification catalyst devices examined in Examples 1 to 3.

The exhaust gas purification catalyst device of the present invention is:

an exhaust gas purification catalyst device having a catalyst coating layer which extends from an upstream side to a downstream side of an exhaust gas flow, wherein the catalyst coating layer has three or more zones present in order facing from the upstream side to the downstream side of the exhaust gas flow, each of the three or more zones is an oxidation catalyst zone or a reduction catalyst zone, in an uppermost layer of the oxidation catalyst zone, a total number of atoms of platinum (Pt) and palladium (Pd) is greater than a number of atoms of rhodium (Rh), in an uppermost layer of the reduction catalyst zone, a number of atoms of rhodium (Rh) is greater than a total number of atoms of platinum (Pt) and palladium (Pd), and the oxidation catalyst zone and the reduction catalyst zone alternate at least twice in the exhaust gas flow direction.

In other words, the catalyst coating layer of the exhaust gas purification catalyst device of the present invention has, from the upstream side to the downstream side of the exhaust gas flow, three or more zones in which the reactivity switches in the order of, for example, an oxidation catalyst zone, a reduction catalyst zone, an oxidation catalyst zone, or three or more zones in which the reactivity switches in the order of, for example, a reduction catalyst zone, an oxidation catalyst zone, and a reduction catalyst zone.

The exhaust gas purification device having such a configuration can efficiently carry out both oxidation purification of CO and HC and reduction purification of $NO_x$ in the exhaust gas.

<Example of Structure of Exhaust Gas Purification Catalyst Device of Present Invention and Mechanism of Action Thereof>

FIG. 1(a) shows an example of the exhaust gas purification catalyst device of the present invention. The catalyst coating layer (10) of the exhaust gas purification catalyst device of FIG. 1(a) has three zones, in order from the upstream side of the exhaust gas flow, in the order of an oxidation catalyst zone (1), a reduction catalyst zone (2), and an oxidation catalyst zone (3), and thus, the oxidation catalyst zone and reduction catalyst zone alternate twice in the exhaust gas flow direction. A conceptual diagram of the change in concentration of CO, HC, and $NO_x$ in the exhaust gas flow direction is shown above the exhaust gas purification catalyst device of FIG. 1(a).

The exhaust gas flowing into the exhaust gas purification catalyst device of FIG. 1(a) first contacts the oxidation catalyst zone (1) upstream of the catalyst coating layer (10), and oxidation purification of CO and HC, and oxidation of NO of $NO_x$ occur in accordance with the following reaction formulas:

$$CO + (\tfrac{1}{2})O_2 \rightarrow CO_2$$

$$\text{Hydrocarbon (HC)} + O_2 \rightarrow H_2O + CO_2$$

$$NO + (\tfrac{1}{2})O_2 \rightarrow NO_2,$$

and as the concentration of CO and HC decreases, the oxygen is consumed, whereby the oxygen concentration in the exhaust gas decreases. Note that in the oxidation catalyst zone (1), reduction purification of $NO_x$ may secondarily occur.

Next, the exhaust gas contacts an intermediate reduction catalyst zone (2). At this time, as a result of priority oxidation purification in the oxidation catalyst zone (1), the concentration of CO and HC in the exhaust gas is significantly decreased, but the $NO_x$ concentration remains relatively high. The oxygen concentration in the exhaust gas decreases. Thus, in the reduction catalytic zone (2), the reduction purification of $NO_2$ in the $NO_x$ proceeds at a high rate in accordance with the following reaction formula:

$$2NO_2 \rightarrow N_2 + 2O_2$$

and as the $NO_x$ concentration decreases sharply, oxygen is released, whereby the oxygen concentration in the exhaust gas increases. Note that in the reduction catalyst zone (2), oxidation purification of CO and HC may secondarily occur.

The exhaust gas then contacts the oxidation catalyst zone (3) on the upstream side. At this time, though the concentration of $NO_x$ in the exhaust gas is greatly decreased by reduction purification of the reduction catalyst zone (2), the concentration of CO and HC is maintained to some extent without greatly decreasing from the concentration after passing through the oxidation catalyst zone (1) on the upstream side. The oxidation concentration of the exhaust gas has increased. Thus, in the oxidation catalyst zone (3) on the downstream side, oxidation purification of CO and HC proceeds at a high rate, whereby these concentrations decrease rapidly. Note that in the oxidation catalyst zone (3), reduction purification of $NO_x$ may secondarily occur, whereby $NO_x$ density may be further decreased.

It is considered that the exhaust gas purification catalyst device of FIG. 1(a) can efficiently carry out both oxidation purification of CO and HC and reduction purification of $NO_x$ in the exhaust gas by such a mechanism.

FIG. 1(b) shows another example of the exhaust gas purification catalyst device of the present invention. The catalyst coating layer (20) of the exhaust gas purification catalyst device of FIG. 1(b) has three zones including a reduction catalyst zone (4), an oxidation catalyst zone (5), and a reduction catalyst zone (6) in this order from the upstream side of the exhaust gas flow, and thus, the oxidation catalyst zone and the reduction catalyst zone alternate two times in the exhaust gas flow direction. A conceptual diagram of the concentration changes of CO, HC, and $NO_x$ in the exhaust gas in the exhaust gas flow direction is shown together above the exhaust gas purification catalyst device of FIG. 1(b).

The exhaust gas flowing into the exhaust gas purification catalyst device of FIG. 1(b) first contacts the reduction catalyst zone (4) upstream of the catalyst coating layer (20), where reduction and purification of $NO_2$ in the $NO_x$ occurs with priority, and as the $NO_x$ concentration is decreased, oxygen is released, whereby the oxygen concentration in the exhaust gas increases. Note that in the reduction catalyst zone (4), oxidation purification of CO and HC may secondarily occur.

The exhaust gas then contacts an intermediate oxidation catalyst zone (5). At this time, as a result of priority reduction purification in the reduction catalyst zone (4), though the concentration of $NO_x$ in the exhaust gas is significantly decreased, the concentration of CO and HC is maintained at a relatively high level. The oxygen concentration in the exhaust gas increases. Thus, in the oxidation catalyst zone (5), oxidation purification of CO and HC (as well as oxidation of NO) proceeds at a high rate, whereby the concentration of CO and HC decreases rapidly, and oxygen is consumed and the oxygen concentration in the exhaust gas decreases. Note that in the oxidation catalyst zone (5), reduction purification of $NO_x$ may secondarily occur.

The exhaust gas contacts the reduction catalyst zone (6) on the downstream side. At this time, though the concentration of CO and HC in the exhaust gas is greatly decreased by oxidation purification in the oxidation catalyst zone (5), the concentration of $NO_x$ is maintained to some extent without greatly decreasing from the concentration after passing through the reduction catalyst zone (4) on the upstream side. The oxygen concentration in the exhaust gas decreases. Thus, in the reduction catalyst zone (6) on the downstream side, reduction and purification of $NO_2$ proceeds at a high rate, whereby $NO_x$ density rapidly decreases. Note that in the reduction catalyst zone (6), oxidation purification of CO and HC may secondarily occur, whereby these concentrations may be further decreased.

It is considered that the exhaust gas purification catalyst device of FIG. 1(b) can efficiently carry out both oxidation purification of CO and HC in the exhaust gas and reduction purification of $NO_x$ by such a mechanism.

<Number of Alternations of Oxidation Catalyst Zone and Reduction Catalyst Zone>

In the catalyst coating layer of the exhaust gas purification catalyst device of the present invention, the number of alternations of the oxidation catalyst zone and the reduction catalyst zone in the exhaust gas flow direction is two or more, and may be, for example, two to six. Excessive alternations result in relative shortening of the length of each zone. Thus, in the oxidation catalyst zone, in addition to insufficient oxidation purification reaction, in some cases, the reduction of the oxygen concentration in the exhaust gas due to the consumption of oxygen becomes insufficient, whereby the speed of the reduction purification reaction in a subsequent reduction catalyst zone is impaired. Similarly, in the reduction catalyst zone, in addition to insufficient reduction purification reaction, in some cases, the increase in the oxygen concentration in the exhaust gas due to the release of oxygen becomes insufficient, whereby the speed of the oxidation purification reaction in a subsequent oxidation catalyst zone is impaired. From the viewpoint of avoiding such a situation and effectively expressing the effect of the present invention, the number of alternations of the oxidation catalyst zone and the reduction catalyst zone in the catalyst coating layer is preferably two to four, and more preferably two or three.

<Ratio of Oxidation Catalyst Zone and Reduction Catalyst Zone Lengths>

In the catalyst coating layer of the exhaust gas purification catalyst device of the present invention, it is preferable that each of the oxidation catalyst zone and the reduction catalyst zone have a significant length from the viewpoint of effectively carrying out both oxidation purification of CO and HC and reduction purification of $NO_x$. From this viewpoint, the total length of the oxidation catalyst zones in the catalyst coating layer may be, for example, 10% or more, 15% or more, 20% or more, 30% or more, 40% or more, or 45% or more, and may be 90% or less, 85% or less, 80% or less, 70% or less, 60% or less, or 55% or less, based on the total length of the catalyst coating layer. Similarly, the total length of the reduction catalyst zones may be, for example, 10% or more, 15% or more, 20% or more, 30% or more, 40% or more, or 45% or more, and may be 90% or less, 85% or less, 80% or less, 70% or less, 60% or less, or 55% or less, based on the total length of the catalyst coating layer.

The total length of the oxidation catalyst zones in the catalyst coating layer may typically be 15% to 85%, based on the total length of the catalyst coating layer. The total length of the reduction catalyst zones may typically be 15% to 85%, based on the total length of the catalyst coating layer.

The catalyst coating layer of the exhaust gas purification catalyst device of the present invention may be composed only of oxidation catalyst zones and reduction catalyst zones, or may have zones other than these. Examples of zones other than the oxidation catalyst zones and the reduction catalyst zones include a zone in which the catalytic activity of both the oxidation catalyst and the reduction catalyst is exhibited to the same extent, a zone in which the catalytic activity of a reaction other than a catalyst reaction is exhibited, and a zone in which no catalytic activity is present. The length of the zones other than the oxidation catalyst zones and the reduction catalyst zones in the catalyst coating layer of the exhaust gas purification catalyst device of the present invention may be 10% or less, 5% or less, or 3% or less based on the total length of the catalyst coating layer.

(Structures of Oxidation Catalyst Zone and Reduction Catalyst Zone)

Each zone of the exhaust gas purification catalyst device of the present invention may have a single-layer or multi-layer structure. When the layer is a single layer, the layer may constitute an oxidation catalyst zone or a reduction catalyst zone, and when the layer has a multilayer structure, the uppermost layer may constitute an oxidation catalyst zone or a reduction catalyst zone.

In the exhaust gas purification catalyst device of the present invention, the total number of atoms of Pt and Pd in the oxidation catalyst zone is greater than the number of atoms of Rh in the uppermost layer thereof. It is believed that Pt and Pd exhibit oxidative catalytic activity, and Rh exhibits reductive catalytic activity. Thus, since the number of atoms exhibiting oxidation catalytic activity in the uppermost layer is greater than the number of atoms exhibiting reduction catalytic activity in the uppermost layer, the zone can be an oxidation catalyst zone exhibiting oxidation reaction-dominant catalytic activity. Conversely, since the number of atoms of Rh exhibiting reduction catalytic activity in the reduction catalyst zone is greater than the total number of atoms of Pt and Pd exhibiting oxidation catalytic activity in the uppermost layer thereof, reduction reaction-dominant catalytic activity can be exhibited.

Regarding the ratio of the total number of atoms of Pt and Pd to the number of atoms of Rh in the uppermost layer of the oxidation catalyst zone, it is necessary that the ratio of the total number of atoms of Pt and Pd to the total number of atoms exceed 50 atomic %, and may be 60 atomic % or more, 70 atomic %, 80 atomic % or more, 90 atomic % or more, or 95 atomic % or more, and in particular, may be 100 atomic %.

Regarding the ratio of the total number of atoms of Rh to the total number of atoms of Pt and Pd in the uppermost layer of the reduction catalyst zone, it is necessary that the ratio of the total number of atoms of Rh to the total number of atoms exceed 50 atomic %, and may 60 atomic % or more, 70 atomic % or more, 80 atomic % or more, 90 atomic % or more, or 95 atomic % or more, and in particular, may be 100 atomic %.

The catalyst coating layer of the exhaust gas purification catalyst device of the present invention may have, for example, a configuration including one or more selected from the following two.

(1) The reduction catalyst zone is composed of a catalyst coating layer containing a precious metal, which is Rh, and
the oxidation catalyst zone is composed of a catalyst coating layer having a two-layer structure including a lower layer containing a precious meal, which is Rh, and an upper layer, on the lower layer, containing a precious metal selected from Pt and Pd (catalyst coating layer of the first aspect), and (2) the oxidation catalyst zone is composed of a catalyst coating layer containing a precious metal selected from Pt and Pd, and
the reduction catalyst zone is composed of a catalyst coating layer having a two-layer structure including a lower layer containing a precious metal selected from Pt and Pd and an upper layer, on the lower layer, containing a precious metal, which is Rh (catalyst coating layer of the second aspect).

FIG. 2(a) shows a schematic cross-sectional view showing the configuration of the catalyst coating layer of the first aspect. The catalyst coating layer of the first aspect has a reduction reaction-dominant lower layer containing a precious metal, which is Rh, and an oxidation reaction-dominant upper layer containing a precious metal selected from Pt and Pd. The lower layer is present across the length of the catalyst coating layer. The upper layer is divided, in the catalyst coating layer, into an exhaust gas flow upstream side part and a downstream side part.

In the catalyst coating layer of FIG. 2(a), in the region upstream of the exhaust gas flow, there is a two-layer configuration including a lower layer containing a precious metal, which is Rh, and an upper layer containing a precious metal selected from Pt and Pd. Since the upper layer of this region is an oxidation reaction-dominant layer containing a precious metal selected from Pt and Pd, the oxidation catalyst zone (1) is constituted by these two layers. An upper layer is not formed in the mid-flow region of the exhaust gas flow, and a reduction reaction-dominant lower layer containing a precious metal, which is Rh, is exposed, and the reduction catalyst zone (2) is constituted by this lower layer. In the downstream side region of the exhaust gas flow, a two-layer configuration similar to that of the oxidation catalyst zone (1) is provided, and the oxidation catalyst zone (3) is constituted by these two layers.

In the catalyst coating layer of FIG. 2(a), due to the layer configuration described above, in order from the upstream side of the exhaust gas flow, the oxidation catalyst zone (1), the reduction catalyst zone (2), and the oxidation catalyst zone (3), the oxidation catalyst zone and the reduction catalyst zone alternate two times in the exhaust gas flow direction.

FIG. 2(b) shows a schematic cross-sectional view illustrating the configuration of the catalyst coating layer of the second aspect. The catalyst coating layer of the second aspect includes a reduction reaction-dominant lower layer containing a precious metal selected from Pt and Pd and an oxidation reaction-dominant upper layer containing a precious metal, which is Rh. The lower layer is present across the length of the catalyst coating layer. The upper layer is divided, in the catalyst coating layer, into an exhaust gas flow upstream side part and a downstream side part.

In the catalyst coating layer of FIG. 2(b), in the region upstream of the exhaust gas flow, there is a two-layer configuration including a lower layer containing a precious metal selected from Pt and Pd and an upper layer containing a precious metal, which is Rh. Since the upper layer of this region is a reduction reaction-dominant layer containing a precious metal, which is Rh, the reduction catalyst zone (4) is constituted by these two layers. An upper layer is not formed in the mid-flow region of the exhaust gas flow, and an oxidation reaction-dominant lower layer containing a precious metal selected from Pt and Pd is exposed, whereby oxidation catalyst zone (5) is constituted by this lower layer. In the region on the downstream side of the exhaust gas flow, a two-layer configuration similar to that of the reduction catalyst zone (4) is provided, and the reduction catalyst zone (6) is constituted by these two layers.

In the catalyst coating layer of FIG. 2(b), due to the layer configuration described above, in order from the upstream side of the exhaust gas flow, the reduction catalyst zone (4), the oxidation catalyst zone (5), and the reduction catalyst zone (6) are included, and the oxidation catalyst zone and the reduction catalyst zone alternate two times in the exhaust gas flow direction.

Preferred embodiments of the present invention include embodiments wherein two or more of the catalyst coating layers of the first aspect are combined in series to form an integral catalyst coating layer, two or more of the catalyst coating layers of the second aspect are combined in series to form an integral catalyst coating layer, the catalyst coating layer of the first aspect and the catalyst coating layer of the second aspect are combined in series to form an integral catalyst coating layer, or the catalyst coating layer of the first aspect or the catalyst coating layer of the second aspect and a catalyst coating layer other than these are combined in series to form an integral catalyst coating layer.

<Carrier Particles>

Each of the Pt, Pd, and Rh in the catalyst coating layer of the exhaust gas purification catalyst device of the present invention may be supported on suitable carrier particles. The carrier particles may be, for example, particles of one or more oxides selected from Al, Si, Ce, and Zr oxides. The carrier particles may be selected from particles composed of, for example, alumina (single-body alumina), silica alumina, zeolite, titanium oxide, silica, ceria, zirconia, and composite oxides comprising rare earth elements; and mixtures and solid solutions thereof.

When the catalyst coating layer contains both Pt and Pd, these precious metals may be supported on the same carrier particles or may be supported on separate carrier particles, respectively. From the viewpoint of suppressing a decrease in catalytic activity accompanied by an increase in particle size due to durability by alloying Pt and Pd, the Pt and Pd may be supported on the same carrier particles.

The Rh in the catalyst coating layer may be supported on carrier particles comprising a ceria-zirconia composite oxide.

<Precious Metal Concentration>

The uppermost layer of the oxidation catalyst zone of the catalyst coating layer of the exhaust gas purification catalyst device of the present invention contains a precious metal selected from Pt and Pd. When the reduction catalyst zone has a multilayer structure, the lower layer thereof may contain a precious metal selected from Pt and Pd. When the catalyst coating layer contains Pt, the content thereof may be, for example, 0.01 g/L or more, 0.02 g/L or more, 0.03 g/L or more, 0.04 g/L or more, or 0.05 g/L or more, in terms of metal mass per L volume of the substrate, and may be, for example, 2.0 g/L or less, 1.5 g/L or less, 1.0 g/L or less, or 0.5 g/L or less. When the catalyst coating layer contains Pd, the content thereof may be, for example, 0.1 g/L or more, 0.3 g/L or more, 0.5 g/L or more, or 1.0 g/L or more, in terms of metal mass per L volume of the substrate (to be described later), and may be, for example, 5.0 g/L or less, 4.5 g/L or less, 4.0 g/L or less, 3.5 g/L or less, 3.0 g/L or less, 2.5 g/L or less, or 2.0 g/L or less.

The uppermost layer of the reduction catalyst zone of the catalyst coating layer of the exhaust gas purification catalyst device of the present invention contains a precious metal, which is Rh. When the oxidation catalyst zone has a multilayer structure, the lower layer thereof may contain the Rh. The content of Rh in the catalyst coating layer may be, for example, 0.01 g/L or more, 0.03 g/L or more, 0.05 g/L or more, or 0.10 g/L or more, in terms of metal mass per L volume of the substrate, and may be, for example, 2.0 g/L or less, 1.5 g/L or less, 1.0 g/L or less, or 0.5 g/L or less.

<Optional Components>

As described above, the catalyst coating layer of the exhaust gas purification catalyst device of the present invention contains a precious metal selected from Pt and Pd and a precious metal, which is Rh, and preferably further contains carrier particles therefor, but may also contain other components if necessary. Examples of the other components include oxide particles which do not support the precious metals and an inorganic binder. The oxide particles which do not support the precious metals may be, for example, particles of one or more oxides selected from Al, Si, Ce, and Zr oxides, and may be specifically selected from particles composed of, for example, alumina, silica, ceria, and zirconia, and composite oxides thereof, for example, zeolites. The inorganic binder may be, for example, alumina sol or titania sol.

<Catalyst Coating Layer Coating Amount>

The coating amount of the catalyst coating layer of the exhaust gas purification catalyst device of the present invention may be, as the sum of all layers when the multilayer region is included, for example, as a mass per L volume of the substrate, 20 g/L or more, 50 g/L or more, 100 g/L or more, 120 g/L or more, or 150 g/L or more, and may be, for example, 400 g/L or less, 350 g/L or less, 300 g/L or less, or 250 g/L or less.

<Substrate>

The exhaust gas purification catalyst device of the present invention may include a substrate. Substrates commonly used as the substrate for exhaust gas purification catalysts for automobiles may be used as the substrate of the exhaust gas purification catalyst device of the present invention. For example, the substrate may be a monolith honeycomb substrate. The material constituting the substrate may be, for example, cordierite, SiC, stainless steel, or metal oxide particles. The capacity of the substrate may be, for example, approximately 1 L.

In the exhaust gas purification catalyst device of the present invention, the catalyst coating layer may be present on the substrate, or at least a part of the catalyst coating layer may constitute at least a part of the substrate. When the catalyst coating layer is present on the substrate, for example, a lower layer and an upper layer may be present on the substrate as shown in FIG. 2(a) or 2(b) described above. When the catalyst coating layer constitutes the substrate, for example, a lower layer as shown in FIG. 2(a) or FIG. 2(b) described above constitutes at least a portion of the substrate, and the upper layer shown in FIG. 2(a) or FIG. 2(b) described above may be present on the lower layer.

<Aspect of Exhaust Gas Purification Catalyst Device>

A more detailed embodiment of the exhaust gas purification catalyst device of the present invention will be described below as an example of the case in which the catalyst coating layer is present on a substrate.

The catalyst coating layer of the exhaust gas purification catalyst device of the present invention may be present on a single substrate or may be divided and present on two or more substrates arranged in series in the exhaust gas flow direction. When the catalyst coating layer is present divided on two or more substrates, the number alternations of the oxidation catalyst zone and the reduction catalyst zone may be evaluated by considering the plurality of divided catalyst coating layers as an integral catalyst coating layer in which the divided catalyst coating layers are connected in the order of arrangement. For example, when the catalyst coating layer is divided on two substrates, in which the catalyst coating layer is arranged in series in the exhaust gas flow direction, and the catalyst coating layer on the upstream substrate has an oxidation catalyst zone and a reduction catalyst zone in this order in the exhaust gas flow direction, and the catalyst coating layer on the downstream substrate has a reduction catalyst zone and an oxidation catalyst zone in this order in the exhaust gas flow direction, the reduction catalyst zone on the rear side of the upstream coating layer and the reduction catalyst zone on the front side of the downstream coating layer may be considered as a single reduction catalyst zone. This catalyst coating layer is a catalyst coating layer having an oxidation catalyst zone, a reduction catalyst zone, and an oxidation catalyst zone in this order, and it may be evaluated that the oxidation catalyst zone and the reduction catalyst zone alternate two times.

The number of substrates on which the catalyst coating layer of the exhaust gas purification catalyst device of the present invention are present is preferably one or two.

When the catalyst coating layer is divided and present on two substrates arranged in series in the exhaust gas flow direction, the exhaust gas purification catalyst device may be a combination of a pre-stage catalyst and a post-stage catalyst. In this case, at least the post-stage catalyst may be an underfloor catalyst.

<<Exhaust Gas Purification Catalyst Device Production Method>>

The exhaust gas purification catalyst of the present invention may be produced by any method as long as it has a catalyst layer as described above. A typical method of producing the exhaust gas purification catalyst of the present invention in which the catalyst coating layer is the catalyst coating layer of the first aspect will be described as an example. An exhaust gas purification device having the catalyst coating layer of the first aspect may be produced by, for example, any of the following methods.

<First Production Method>

The first production method for obtaining the exhaust gas purification catalyst device of the present invention may include the steps of, for example;

applying a coating liquid for forming a Rh-containing layer containing a Rh precursor and oxide particles onto a substrate to form a coating film of the coating liquid for forming a Rh-containing layer, firing the coating film of the coating liquid for forming a Rh-containing layer to form a Rh-containing layer, applying a coating liquid for forming a Pt and Pd-containing layer containing a precursor of precious metal selected from Pt and Pd and oxide particles onto a part of the substrate on which the Rh-containing layer is formed to form a coating film of the coating liquid for forming a Pt and Pd-containing layer, and firing the coating film of the coating liquid for forming a Pt and Pd-containing layer to form a Pt and Pd-containing layer.

According to the first production method, an exhaust gas purification catalyst device in which the catalyst coating layer is present on a substrate can be obtained.

For example, among the Rh-containing layers formed on the substrate, the Pt and Pd-containing layers are formed on a part of the exhaust gas flow upstream side and a part of the downstream side, whereby the Rh-containing layer can be configured so as to be exposed in the intermediate region. According to this method, an exhaust gas purification catalyst device having the catalyst coating layer on a single substrate is obtained, and this catalyst coating layer has an oxidation catalyst zone (Pt and Pd-containing layer on the upstream side), a reduction catalyst zone (an intermediate Rh-containing layer), and an oxidation catalyst zone (Pt and Pd-containing layer on the downstream side) in this order, and as a result, a catalyst coating layer of the first aspect, in which the oxidation catalyst zone and the reduction catalyst zone alternate two times, is formed.

For example, a Pt and Pd-containing layer is formed on a part of the exhaust gas flow upstream side of the Rh-containing layer formed on the substrate, whereby a Pt and Pd-containing layer can be formed on a part of the exhaust gas flow downstream side of the Rh-containing layer formed on another substrate, and these can be combined in series in this order. According to this method, an exhaust gas purification catalyst device in which the catalyst coating layer is divided and arranged on two substrates is obtained, and the catalyst coating layer has an oxidation catalyst zone (Pt and Pd-containing layer on the upstream side of the upstream substrate), a reduction catalyst zone (Rh-containing layer on the downstream side of the upstream substrate and the upstream side of the downstream substrate), and an oxidation catalyst zone (Pt and Pd-containing layer on the downstream side of the downstream substrate) in this order, and as a result, a catalyst coating layer of the first aspect, in which the oxidation catalyst zone and the reduction catalyst zone alternate two times, is formed.

The Rh, Pt, and Pd precursors in the coating liquid may be selected from nitrates, sulfates, chlorides, and acetylacetone complexes thereof. The oxide particles may be appropriately selected in accordance with the type of carrier particles in the desired catalyst coating layer. The solvent of the coating liquid may be an aqueous solvent, and is typically water. The coating liquid in this case is an aqueous slurry.

As a method of coating the coating liquid, for example, a known method such as a dipping method, a pouring method, or a push-up method can be used without limitation. After application of the coating liquid, a step for removing the solvent may be carried out if necessary. This step may be carried out by heating at a temperature of, for example, 60 to 300° C., and preferably 120 to 250° C., for example, 5 to 120 minutes, preferably 10 to 60 minutes. The heating temperature at the time of firing may be, for example, 300° C. or more or 400° C. or more, and 1000° C. or less, and is preferably 500° C. to 800° C. The heating time of firing may be, for example, 0.1 to 10 hours, and is preferably 0.5 to 5 hours.

In the first production method, if the formation order of the Rh containing layer and the Pt and Pd containing layer is reversed, an exhaust gas purification catalyst device in which the catalyst coating layer of the second aspect is present on the substrate can be obtained.

<Second Production Method>

The second production method for obtaining the exhaust gas purification catalyst device of the present invention can be carried out with appropriate changes by those skilled in the art referring to Patent Literature 3 (Japanese Unexamined Patent Publication (Kokai) No. 2015-85241).

The second production method for obtaining the exhaust gas purification catalyst device of the present invention may be a method including the steps of, for example, molding a composition for forming a Rh-containing substrate containing a Rh precursor, oxide particles, water and a binder into a predetermined substrate shape, firing the composition for forming a Rh-containing substrate molded into a substrate shape to form a Rh-containing substrate, applying a coating solution for forming a Pt and Pd-containing layer containing oxide particles and a precursor of a precious metal selected from Pt and Pd onto a part of the Rh-containing substrate to form a coating film of a coating liquid for forming a Pt and Pd-containing layer, and firing the coating film of the coating liquid for forming a Pt and Pd-containing layer to form a Pt and Pd-containing layer.

According to the second production method, an exhaust gas purification catalyst device in which a part of the catalyst coating layer (Rh-containing layer) constitutes the entirety of the substrate can be obtained.

The formation position of the Pt and Pd-containing layer on the Rh-containing substrate may be appropriately set by a person skilled in art with reference to the description of the above first production method in accordance with the configuration of the catalyst coating layer of the desired exhaust gas purification catalyst device.

The binder of the composition for forming a Rh-containing substrate may be, for example, alumina sol or titania sol. The composition for forming a Rh-containing substrate molded into a substrate shape and the firing conditions at the time of forming the Pt and Pd-containing layer may be appropriately set by a person skilled in art with reference to the description of the above-described first production method.

EXAMPLES

<<Preparation of Coating Liquid for Forming Coating layer>>

Preparation Example 1

30 parts by mass of an aqueous palladium nitrate solution having a concentration, in terms of metal palladium, of 5% by mass (corresponding to 1.5 parts by mass of metal palladium), 50 parts by mass of alumina, and 50 parts by mass of a cerium-based composite oxide (CeO$_2$ content: 55% by mass) were charged into 100 parts by mass of ion-exchanged water and stirred to obtain a coating liquid 1.

Preparation Example 2

4 parts by mass of an aqueous solution of rhodium nitrate having a concentration, in terms of metallic rhodium, of 5% by mass (corresponding to 0.2 parts by mass of metallic rhodium), 50 parts by mass of alumina, and 50 parts by mass of a zirconium-based composite oxide (ZrO$_2$ content: 70% by mass) were charged into 100 parts by mass of ion-exchanged water and stirred to obtain a coating liquid 2.

<<Production of Single-Stage Catalyst>>

Production Example 1

(1) Formation of Lower Layer

Coating liquid 1 was applied onto a monolith honeycomb substrate having a total length of 100 mm and a volume of 1 L at a width of 100 mm, dried by heating for 1 hour at 250° C., and fired for 1 hour at 500° C., to form a lower layer on the substrate. The total mass of the lower layer was 101.5 g, in which the mass of palladium was 1.5 g.

(2) Formation of Upper Layer

Coating liquid 2 was applied onto the substrate after formation of the lower layer at a width of 100 mm, dried by heating for 1 hour at 250° C., and then fired for 1 hour at 500° C., to further form an upper layer on the lower layer, to obtain a catalyst A. The total mass of the upper layer of catalyst A was 100.2 g, in which the mass of rhodium was 0.2 g.

Production Examples 2 to 20

Catalysts B to T were obtained in the same manner as in Production Example 1, except that the coating liquids described in Table 1 were used for the formation of the lower layer and the upper layer, respectively, and the coating width of the upper layer was set to the widths described in Table 1 from the upstream end portion (Fr) or the downstream end portion (Rr) of the exhaust gas flow.

Production Example 21

(1) Formation of Lower Layer

Using coating liquid 1, a lower layer was formed on a monolith honeycomb substrate in the same manner as in Production Example 1, and the total mass of the lower layer was 101.5 g, in which the mass of palladium was 1.5 g.

(2) Formation of Upper Layer

Coating liquid 2 was applied onto the substrate after formation of the lower layer at a width of 35 mm from the upstream end portion (Fr) of the exhaust gas flow, and after drying by heating for 1 hour at 50° C., firing was carried out for 1 hour at 500° C., to form an upstream upper layer on the lower layer. The total mass of the upstream upper layer was 50.1 g, in which the mass of rhodium was 0.1 g. Thereafter, coating liquid 2 was applied onto the substrate after formation of the lower layer and the upstream upper layer at a width of 35 mm from the downstream side end portion (Rr) of the exhaust gas flow, dried by heating for 1 hour at 50° C., and then fired at 500° C. for 1 hour to form a lower upper layer on the lower layer, whereby a catalyst U was obtained. The total mass of the downstream upper layer of catalyst U was 50.1 g, in which the mass of rhodium was 0.1 g.

Production Example 22

(1) Formation of Lower Layer

Using coating liquid 2, a lower layer was formed on a monolith honeycomb substrate in the same manner as in Production Example 2, and the total mass of the lower layer was 100.2 g, in which the mass of rhodium was 0.2 g.

(2) Formation of Upper Layer

Coating liquid 1 was applied onto the substrate after formation of the lower layer at a width of 35 mm from the upstream end portion (Fr) of the exhaust gas flow, and after drying by heating for 1 hour at 50° C., was fired for 1 hour at 500° C. to form an upstream upper layer on the lower layer. The total mass of this upstream upper layer was 50.75 g, in which the mass of palladium was 0.75 g. Thereafter, coating liquid 1 was applied onto the substrate after formation of the lower layer and the upstream upper layer at a width of 35 mm from the downstream side end portion (Rr) of the exhaust gas flow, dried by heating for 1 hour at 50° C., and then fired for 1 hour at 500° C., to form a lower upper layer on the lower layer, whereby a catalyst V was obtained.

The total mass of the downstream upper layer of catalyst V was 50.75 g, in which the mass of palladium was 0.75 g.

Table 1 shows the reactivity of each catalyst obtained in the above production examples together for each zone. "Md" of the column "reactivity" of Production Examples 21 and 22 means an intermediate zone located between the upstream zone and the downstream zone of the catalyst.

Examples 2 to 15

Exhaust gas purification performance was examined in the same manner as in Example 1, except that the single-stage catalysts described in Table 2 were used as the pre-stage catalysts and the underfloor catalysts. The results are shown in Table 2.

TABLE 1

| | | Lower Layer | | | Upper Layer | | | |
|---|---|---|---|---|---|---|---|---|
| | Name | Coating Liquid | Coating Width | Precious Metal | Coating Liquid | Coating Width | Precious Metal | Zone Reactivity |
| Prod Ex 1 | Catalyst A | Coating Liquid 1 | 100 mm | Pd 1.5 g | Coating Liquid 2 | 100 mm | Rh 0.2 g | Reduction Catalyst |
| Prod Ex 2 | Catalyst B | Coating Liquid 2 | 100 mm | Rh 0.2 g | Coating Liquid 1 | 100 mm | Pd 1.5 g | Oxidation Catalyst |
| Prod Ex 3 | Catalyst C | Coating Liquid 1 | 100 mm | Pd 1.5 g | Coating Liquid 2 | 90 mm from Fr | Rh 0.2 g | Fr 90 mm: Reduction Catalyst + Rr 10 mm: Oxidation Catalyst |
| Prod Ex 4 | Catalyst D | Coating Liquid 1 | 100 mm | Pd 1.5 g | Coating Liquid 2 | 90 mm from Rr | Rh 0.2 g | Fr 10 mm: Oxidation Catalyst + Rr 90 mm: Reduction Catalyst |
| Prod Ex 5 | Catalyst E | Coating Liquid 1 | 100 mm | Pd 1.5 g | Coating Liquid 2 | 85 mm from Fr | Rh 0.2 g | Fr 85 mm: Reduction Catalyst + Rr 15 mm: Oxidation Catalyst |
| Prod Ex 6 | Catalyst F | Coating Liquid 1 | 100 mm | Pd 1.5 g | Coating Liquid 2 | 85 mm from Rr | Rh 0.2 g | Fr 15 mm: Oxidation Catalyst + Rr 85 mm: Reduction Catalyst |
| Prod Ex 7 | Catalyst G | Coating Liquid 1 | 100 mm | Pd 1.5 g | Coating Liquid 2 | 70 mm from Fr | Rh 0.2 g | Fr 70 mm: Reduction Catalyst + Rr 30 mm: Oxidation Catalyst |
| Prod Ex 8 | Catalyst H | Coating Liquid 1 | 100 mm | Pd 1.5 g | Coating Liquid 2 | 70 mm from Rr | Rh 0.2 g | Fr 30 mm: Oxidation Catalyst + Rr 70 mm: Reduction Catalyst |
| Prod Ex 9 | Catalyst I | Coating Liquid 1 | 100 mm | Pd 1.5 g | Coating Liquid 2 | 55 mm from Fr | Rh 0.2 g | Fr 55 mm: Reduction Catalyst + Rr 45 mm: Oxidation Catalyst |
| Prod Ex 10 | Catalyst J | Coating Liquid 1 | 100 mm | Pd 1.5 g | Coating Liquid 2 | 55 mm from Rr | Rh 0.2 g | Fr 45 mm: Oxidation Catalyst + Rr 55 mm: Reduction Catalyst |
| Prod Ex 11 | Catalyst K | Coating Liquid 2 | 100 mm | Rh 0.2 g | Coating Liquid 1 | 90 mm from Fr | Pd 1.5 g | Fr 90 mm: Oxidation Catalyst + Rr 10 mm: Reduction Catalyst |
| Prod Ex 12 | Catalyst L | Coating Liquid 2 | 100 mm | Rh 0.2 g | Coating Liquid 1 | 90 mm from Rr | Pd 1.5 g | Fr 90 mm: Reduction Catalyst + Rr 10 mm: Oxidation Catalyst |
| Prod Ex 13 | Catalyst M | Coating Liquid 2 | 100 mm | Rh 0.2 g | Coating Liquid 1 | 85 mm from Fr | Pd 1.5 g | Fr 85 mm: Oxidation Catalyst + Rr 15 mm: Reduction Catalyst |
| Prod Ex 14 | Catalyst N | Coating Liquid 2 | 100 mm | Rh 0.2 g | Coating Liquid 1 | 85 mm from Rr | Pd 1.5 g | Fr 15 mm: Reduction Catalyst + Rr 85 mm: Oxidation Catalyst |
| Prod Ex 15 | Catalyst O | Coating Liquid 2 | 100 mm | Rh 0.2 g | Coating Liquid 1 | 70 mm from Fr | Pd 1.5 g | Fr 70 mm: Oxidation Catalyst + Rr 30 mm: Reduction Catalyst |
| Prod Ex 16 | Catalyst P | Coating Liquid 2 | 100 mm | Rh 0.2 g | Coating Liquid 1 | 70 mm from Rr | Pd 1.5 g | Fr 30 mm: Reduction Catalyst + Rr 70 mm: Oxidation Catalyst |
| Prod Ex 17 | Catalyst Q | Coating Liquid 2 | 100 mm | Rh 0.2 g | Coating Liquid 1 | 55 mm from Fr | Pd 1.5 g | Fr 55 mm: Oxidation Catalyst + Rr 45 mm: Reduction Catalyst |
| Prod Ex 18 | Catalyst R | Coating Liquid 2 | 100 mm | Rh 0.2 g | Coating Liquid 1 | 55 mm from Rr | Pd 1.5 g | Fr 45 mm: Reduction Catalyst + Rr 55 mm: Oxidation Catalyst |
| Prod Ex 19 | Catalyst S | Coating Liquid 2 | 100 mm | Rh 0.2 g | Coating Liquid 1 | 40 mm from Fr | Pd 1.5 g | Fr 40 mm: Oxidation Catalyst + Rr 60 mm: Reduction Catalyst |
| Prod Ex 20 | Catalyst T | Coating Liquid 2 | 100 mm | Rh 0.2 g | Coating Liquid 1 | 40 mm from Rr | Pd 1.5 g | Fr 60 mm: Reduction Catalyst + Rr 40 mm: Oxidation Catalyst |
| Prod Ex 21 | Catalyst U | Coating Liquid 1 | 100 mm | Pd 1.5 g | Coating Liquid 2 | 35 mm from Fr 35 mm from Rr | Rh 0.1 g Rh 0.1 g | Fr 35 mm: Reduction Catalyst + Md 30 mm: Oxidation Catalyst + Rr 35 mm: Reduction Catalyst |
| Prod Ex 22 | Catalyst V | Coating Liquid 2 | 100 mm | Rh 0.2 g | Coating Liquid 1 | 35 mm from Fr 35 mm from Rr | Pd 0.75 g Pd 0.75 g | Fr 35 mm: Oxidation Catalyst + Md 30 mm: Reduction Catalyst + Rr 35 mm: Oxidation Catalyst |

Example 1

An exhaust gas purification catalyst was constructed using catalyst A as a pre-stage catalyst and an underfloor catalyst, and the exhaust gas purification performance thereof was examined. The exhaust gas purification catalyst device was mounted on a gasoline engine having an exhaust volume of 4000 cc, and endurance evaluation was carried out for 20 hours under conditions of an average engine rotation speed of 3500 rpm and a catalyst gas inlet temperature of 1000° C. The catalysts after endurance evaluation were mounted on a vehicle having an exhaust volume of 5300 cc and running was carried out in the FTP-75 mode. The emissions of HC, CO, and $NO_x$ from the tailpipe were measured to evaluate the total hydrocarbon (THC) emissions and $NO_x$ emissions per mile of running. The results are shown in Table 2.

Example 16

Exhaust gas purification performance was examined in the same manner as in Example 1, except that a single-stage catalyst composed of catalyst A was used as the exhaust gas purification catalyst device. The results are shown in Table 2.

Examples 17 to 19

Exhaust gas purification performance was examined in the same manner as in Example 1, except that the single-stage catalysts described in Table 2 were used as the exhaust gas purification catalyst device. The results are shown in Table 2.

<<Presentation of Drawings>>

Figure 4:
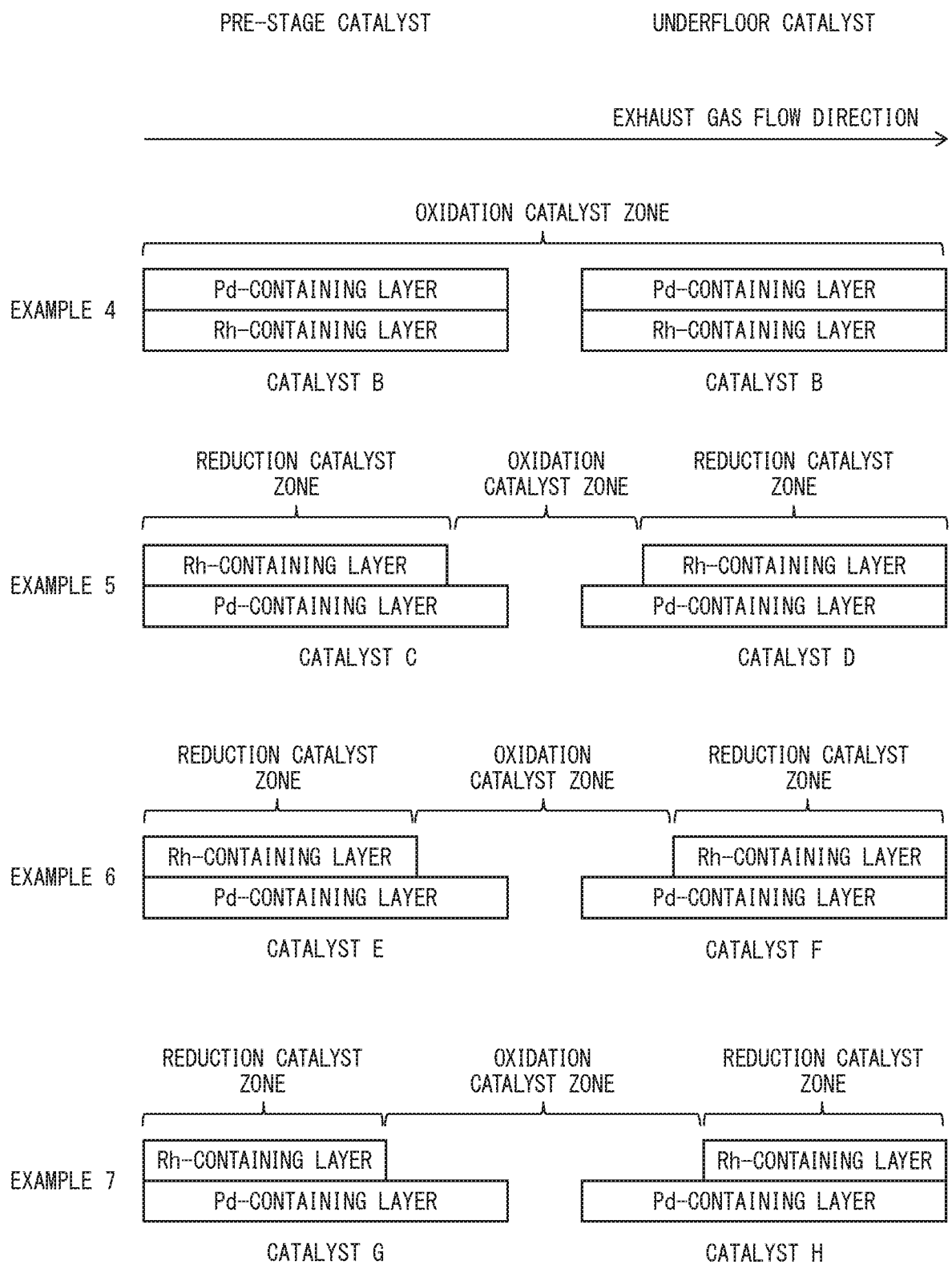
FIG. 4 is a schematic cross-sectional view showing the structures of the catalyst coating layers of the exhaust gas purification catalyst devices examined in Examples 4 to 7.
Figure 5:
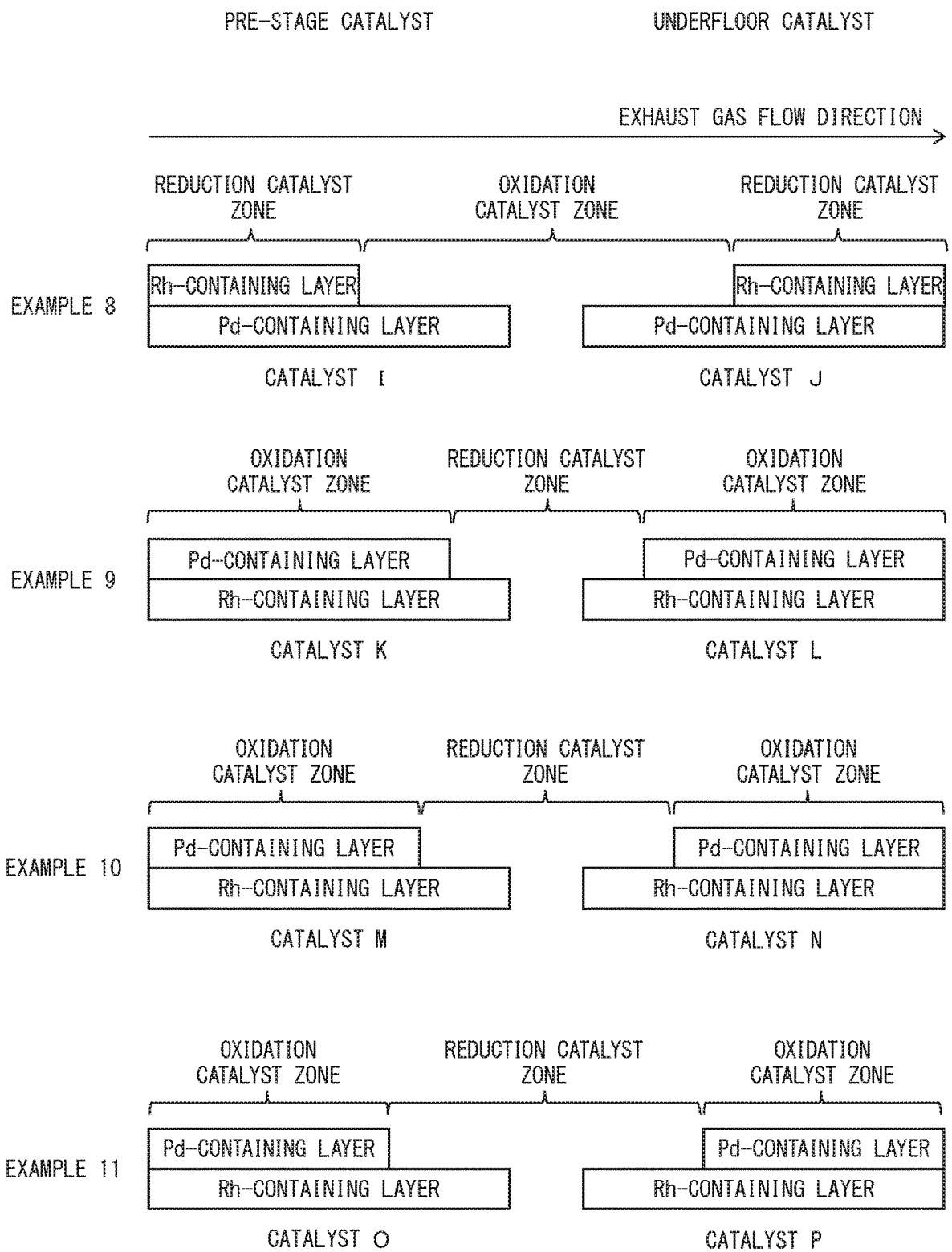
FIG. 5 is a schematic cross-sectional view showing the structures of the catalyst coating layers of the exhaust gas purification catalyst devices examined in Examples 8 to 11.
Figure 6:
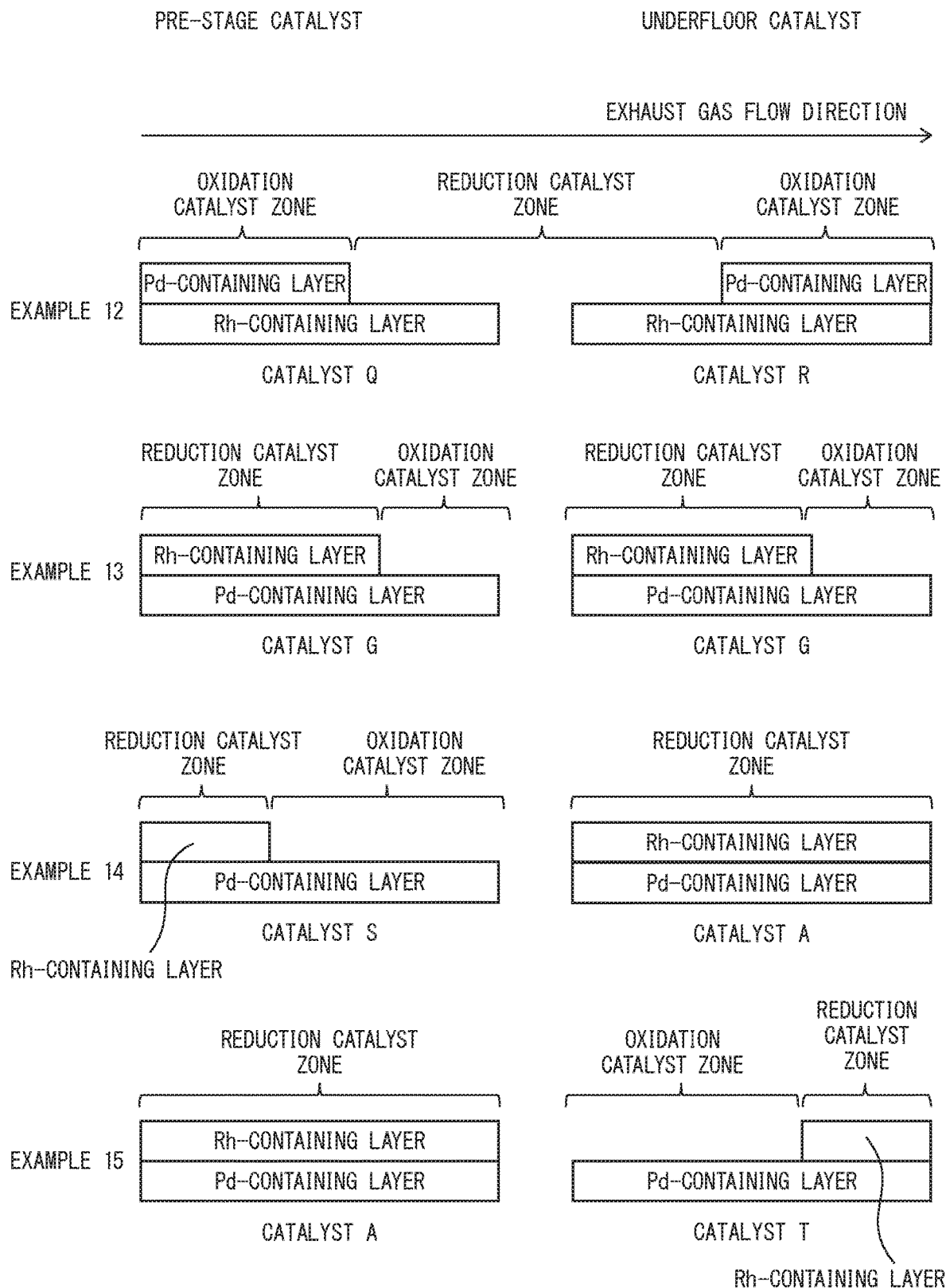
FIG. 6 is a schematic cross-sectional view showing the structures of the catalyst coating layers of the exhaust gas purification catalyst devices examined in Examples 12 to 15.
Figure 7:
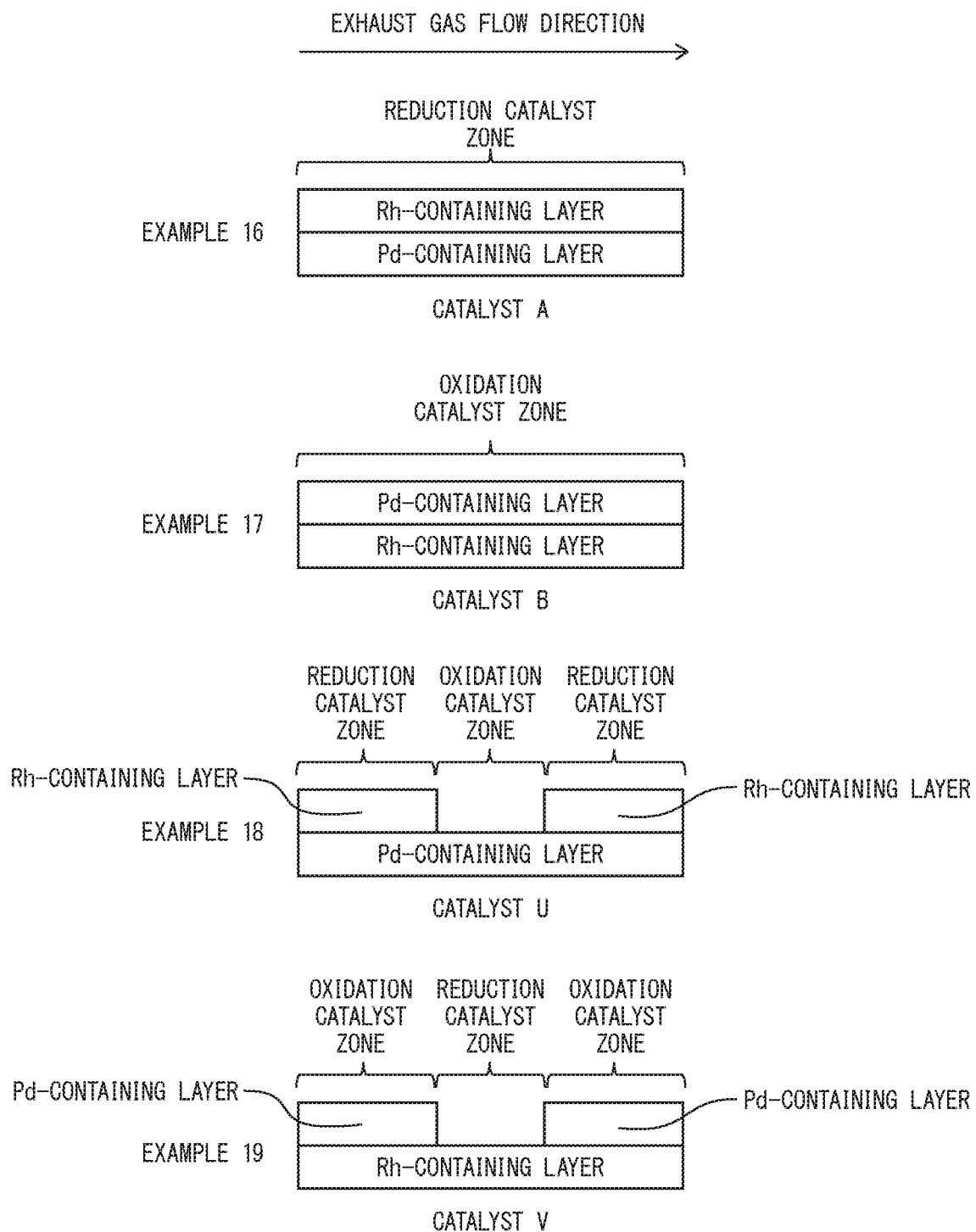
FIG. 7 is a schematic cross-sectional view showing the structures of the catalyst coating layers of the exhaust gas purification catalyst devices examined in Examples 16 to 19.

Schematic cross-sectional views showing the configurations of the exhaust gas purification catalyst devices used in Examples 1 to 19 are shown in FIGS. 3 to 7.

zones arranged in the center of the coating layers were 30 mm (15% of the total length), 60 mm (30% of the total length), and 90 mm (45% of the total length), respectively, both $NO_x$ and THC emissions were further decreased.

TABLE 2

Exhaust Gas Purification Catalyst Device Structure

| | Pre-Stage | Under-floor | Coating Layer Total Length (mm) | Zone Reactivity | Exhaust Gas (mg/mile) THC | $NO_X$ |
|---|---|---|---|---|---|---|
| Ex 1 | A | A | 200 | 200 mm: Reduction Catalyst | 31 | 22 |
| Ex 2 | A | B | 200 | Fr 100 mm: Reduction Catalyst + Rr 100 mm: Oxidation Catalyst | 29 | 27 |
| Ex 3 | B | A | 200 | Fr 100 mm: Oxidation Catalyst + Rr 100 mm: Reduction Catalyst | 27 | 30 |
| Ex 4 | B | B | 200 | 200 mm: Oxidation Catalyst | 21 | 33 |
| Ex 5 | C | D | 200 | Fr 90 mm: Reduction Catalyst + Md 20 mm: Oxidation Catalyst + Rr 90 mm: Reduction Catalyst | 30 | 21 |
| Ex 6 | E | F | 200 | Fr 85 mm: Reduction Catalyst + Md 30 mm: Oxidation Catalyst + Rr 85 mm: Reduction Catalyst | 22 | 10 |
| Ex 7 | G | H | 200 | Fr 70 mm: Reduction Catalyst + Md 60 mm: Oxidation Catalyst + Rr 70 mm: Reduction Catalyst | 18 | 12 |
| Ex 8 | I | J | 200 | Fr 55 mm: Reduction Catalyst + Md 90 mm: Oxidation Catalyst + Rr 55 mm: Reduction Catalyst | 18 | 18 |
| Ex 9 | K | L | 200 | Fr 90 mm: Oxidation Catalyst + Md 20 mm: Reduction Catalyst + Rr 90 mm: Oxidation Catalyst | 22 | 31 |
| Ex 10 | M | N | 200 | Fr 85 mm: Oxidation Catalyst + Md 30 mm: Reduction Catalyst + Rr 85 mm: Oxidation Catalyst | 15 | 18 |
| Ex 11 | O | P | 200 | Fr 70 mm: Oxidation Catalyst + Md 60 mm: Reduction Catalyst + Rr 70 mm: Oxidation Catalyst | 17 | 15 |
| Ex 12 | Q | R | 200 | Fr 55 mm: Oxidation Catalyst + Md 90 mm: Reduction Catalyst + Rr 55 mm: Oxidation Catalyst | 18 | 12 |
| Ex 13 | G | G | 200 | Fr 70 mm: Reduction Catalyst + Md(1) 30 mm: Oxidation Catalyst + Md(2) 70 mm: Reduction Catalyst + Rr 30 mm: Oxidation Catalyst | 18 | 11 |
| Ex 14 | S | A | 200 | Fr 40 mm: Reduction Catalyst + Md 60 mm: Oxidation Catalyst + Rr 100 mm: Reduction Catalyst | 21 | 14 |
| Ex 15 | A | T | 200 | Fr 100 mm: Reduction Catalyst + Md 60 mm: Oxidation Catalyst + Rr 40 mm: Reduction Catalyst | 21 | 13 |
| Ex 16 | | A | 100 | 100 mm: Reduction Catalyst | 63 | 47 |
| Ex 17 | | B | 100 | 100 mm: Oxidation Catalyst | 48 | 66 |
| Ex 18 | | U | 100 | Fr 35 mm: Reduction Catalyst + Md 30 mm: Oxidation Catalyst + Rr 35 mm: Reduction Catalyst | 50 | 38 |
| Ex 19 | | V | 100 | Fr 35 mm: Oxidation Catalys + Md 30 mm: Reduction Catalyst + Rr 35 mm: Oxidation Catalyst | 42 | 49 |

In Table 2, the exhaust gas purification catalyst devices of Examples 1 to 15, which had pre-stage catalysts and under-floor catalysts and which had a total coating layer length of 200 mm will be compared.

In the exhaust gas purification catalyst devices of Examples 2 and 3, in which the coating layer was divided into two and one oxidation catalyst zone and one reduction catalyst zone were arranged (the oxidation catalyst zone and the reduction catalyst zone alternated 1 time), though the THC emission, which is related to oxidation purification, was decreased as compared to the exhaust gas purification catalyst device of Example 1 in which the entirety of the coating layer exhibited reactivity of the reduction catalyst, the $NO_x$ emission, which is related to reduction purification, was increased.

Conversely, in the exhaust gas purification catalyst device of Example 5, in which an oxidation catalyst zone having a length of 20 mm (10% of the total length) was arranged in the central portion of the coating layer and which had a three-zone configuration including a reduction catalyst zone, an oxidation catalyst zone, and a reduction catalyst zone (the oxidation catalyst zone and the reduction catalyst zone alternate two times), the $NO_x$ and the THC emissions were slightly decreased as compared to Example 1. In Examples 6, 7, and 8, in which the lengths of the oxidation catalytic Examples 14 and 15, in which the arrangement position of the oxidation catalyst zone having a length of 60 mm (30% of the total length) was slightly shifted from the center portion of the coating layer, also exhibited a large reduction in both $NO_x$ and THC emissions as compared to Example 1. Note that, not only were THC emissions decreased, but also $NO_x$ emissions were decreased, even though the length of the reduction catalyst zone was decreased, as compared to the exhaust gas purification catalyst device of Example 1.

In the exhaust gas purification catalyst device of Example 9, in which a reduction catalyst zone having a length of 20 mm (10% of the total length) was arranged in the central portion of the coating layer (the oxidation catalyst zone and the reduction catalyst zone alternated two times), though the THC emission increased slightly as compared to the exhaust gas purification catalyst device of Example 4, in which the entirety of the coating layer exhibited oxidation catalyst reactivity, the $NO_x$ emission decreased. In Examples 10, 11, and 12, in which the lengths of the reduction catalytic zones located in the center of the coating layers were 30 mm (15% of the total length), 60 mm (30%), and 90 mm (45%), respectively, both $NO_x$ and THC emissions were significantly decreased. In Examples 10, 11, and 12, not only $NO_x$ but also THC emissions were decreased, even though the length of the oxidation catalyst zone was decreased, as compared to the exhaust gas purification catalyst device of Example 2.

Next, the exhaust gas purification catalyst devices of Examples 16 to 19, which were composed of a single-stage catalyst and which had coating layers having a total length of 100 mm, will be compared.

In the exhaust gas purification catalyst device of Example 16, in which the entirety of the coating layer exhibited reduction catalytic reactivity, the THC emission, which is related to oxidation purification, was large. Conversely, in the exhaust gas purification catalyst device of Example 18, in which an oxidation catalyst zone having a length of 30 mm (30% of the total length) was arranged in the central portion of the coating layer (the oxidation catalyst zone and the reduction catalyst zone alternated two times), the THC emission was decreased and the $NO_x$ emission, which is related to reduction purification, was also decreased.

In the exhaust gas purification catalyst device of Example 17, in which the entirety of the coating layer exhibited oxidation catalytic reactivity, the $NO_x$ emission, which is related to reduction purification, was large. Conversely, in the exhaust gas purification catalyst device of Example 19, in which a reduction catalyst zone having a length of 30 mm (30% of the total length) was arranged in the central portion of the coating layer (the oxidation catalyst zone and the reduction catalyst zone alternated two times), the $NO_x$ emission was decreased and the THC emission, which is related to oxidation purification, was also decreased.

From the foregoing, it has been confirmed that the exhaust gas purification catalyst device of the present invention, which has a configuration in which the catalyst coating layer is divided into three or more zones in the length direction and the oxidation catalyst zone and the reduction catalyst zone alternate two or more times, can efficiently decrease both the THC emission, which is related to oxidation purification, and the $NO_x$ emission, which is related to reduction purification.

REFERENCE SIGNS LIST 1, 3, 5 oxidation catalyst zone
2, 4, 6 reduction catalyst zone
10, 20 catalyst coating layer

The invention claimed is:

1. An exhaust gas purification catalyst device comprising a catalyst coating layer which extends from an upstream side to a downstream side of an exhaust gas flow, wherein
the catalyst coating layer includes three or more zones present in order facing from the upstream side to the downstream side of the exhaust gas flow,
each of the three or more zones is an oxidation catalyst zone or a reduction catalyst zone,
in a direction from the upstream side to the downstream side of the exhaust gas flow, a reactivity of the three or more zones switches between the oxidation catalyst zone and the reduction catalyst zone at least twice,
in an uppermost layer of the oxidation catalyst zone, a total number of atoms of platinum and palladium is greater than a number of atoms of rhodium,
in an uppermost layer of the reduction catalyst zone, a number of atoms of rhodium is greater than a total number of atoms of platinum and palladium,
the reduction catalyst zone is composed of a reduction catalyst coating layer containing a precious metal, which is Rh, and the oxidation catalyst zone is composed of an oxidation catalyst coating layer having a two-layer structure including a lower layer containing a precious metal, which is Rh, and an upper layer that is on the lower layer and contains a precious metal selected from Pt and Pd.

2. The exhaust gas purification catalyst device according to claim 1, wherein among the three or more zones, a total length of the oxidation catalyst zone is in a range of 15% to 85% of a total length of the catalyst coating layer.

3. The exhaust gas purification catalyst device according to claim 1, wherein among the three or more zones, a total length of the reduction catalyst zone is in a range of 15% to 85% of a total length of the catalyst coating layer.

4. The exhaust gas purification catalyst device according to claim 1, wherein the reactivity of three zones of the three or more zones switches in an order of the oxidation catalyst zone, the reduction catalyst zone, and the oxidation catalyst zone, in the direction from the upstream side to the downstream side of the exhaust gas flow.

5. The exhaust gas purification catalyst device according to claim 1, wherein the catalyst coating layer is present on a substrate.

6. The exhaust gas purification catalyst device according to claim 5, wherein
the catalyst coating layer is divided and present on two substrates arranged in series in the direction of the exhaust gas flow, and
the exhaust gas purification catalyst device is a combination of a pre-stage catalyst and a post-stage catalyst.

7. The exhaust gas purification catalyst device according to claim 6, wherein the post-stage catalyst is an underfloor catalyst.

8. The exhaust gas purification catalyst device according to claim 5, wherein the catalyst coating layer is present on one substrate.

9. The exhaust gas purification catalyst device according to claim 1, wherein at least a part of the catalyst coating layer constitutes a part of a substrate.

10. The exhaust gas purification catalyst device according to claim 1, wherein
among the three or more zones, a total length of the oxidation catalyst zone is in a range of 15% to 85% of a total length of the catalyst coating layer, and
among the three or more zones, a total length of the reduction catalyst zone is in a range of 15% to 85% of the total length of the catalyst coating layer.

11. An exhaust gas purification catalyst device comprising a catalyst coating layer which extends from an upstream side to a downstream side of an exhaust gas flow, wherein
the catalyst coating layer includes three or more zones present in order facing from the upstream side to the downstream side of the exhaust gas flow,
each of the three or more zones is an oxidation catalyst zone or a reduction catalyst zone,
in a direction from the upstream side to the downstream side of the exhaust gas flow, a reactivity of the three or more zones switches between the oxidation catalyst zone and the reduction catalyst zone at least twice,
in an uppermost layer of the oxidation catalyst zone, a total number of atoms of platinum and palladium is greater than a number of atoms of rhodium,
in an uppermost layer of the reduction catalyst zone, a number of atoms of rhodium is greater than a total number of atoms of platinum and palladium, the oxidation catalyst zone is composed of an oxidation catalyst coating layer containing a precious metal selected from Pt and Pd, and the reduction catalyst zone is composed of a reduction catalyst coating layer having a two-layer structure including a lower layer containing a precious metal selected from Pt and Pd, and an upper layer that is on the lower layer and contains a precious metal, which is Rh.

12. The exhaust gas purification catalyst device according to claim 11, wherein among the three or more zones, a total length of the oxidation catalyst zone is in a range of 15% to 85% of a total length of the catalyst coating layer.

13. The exhaust gas purification catalyst device according to claim 11, wherein among the three or more zones, a total length of the reduction catalyst zone is in a range of 15% to 85% of a total length of the catalyst coating layer.

14. The exhaust gas purification catalyst device according to claim 11, wherein the reactivity of three zones of the three or more zones switches in an order of the oxidation catalyst zone, the reduction catalyst zone, and the oxidation catalyst zone, in the direction from the upstream side to the downstream side of the exhaust gas flow.

15. The exhaust gas purification catalyst device according to claim 11, wherein the catalyst coating layer is present on a substrate.

16. The exhaust gas purification catalyst device according to claim 15, wherein the catalyst coating layer is divided and present on two substrates arranged in series in the direction of the exhaust gas flow, and the exhaust gas purification catalyst device is a combination of a pre-stage catalyst and a post-stage catalyst.

17. The exhaust gas purification catalyst device according to claim 16, wherein the post-stage catalyst is an underfloor catalyst.

18. The exhaust gas purification catalyst device according to claim 15, wherein the catalyst coating layer is present on one substrate.

19. The exhaust gas purification catalyst device according to claim 11, wherein at least a part of the catalyst coating layer constitutes a part of a substrate.

20. The exhaust gas purification catalyst device according to claim 11, wherein among the three or more zones, a total length of the oxidation catalyst zone is in a range of 15% to 85% of a total length of the catalyst coating layer, and among the three or more zones, a total length of the reduction catalyst zone is in a range of 15% to 85% of the total length of the catalyst coating layer.

* * * * *